US012001210B2

(12) United States Patent
Millard et al.

(10) Patent No.: US 12,001,210 B2
(45) Date of Patent: *Jun. 4, 2024

(54) SEMANTIC OBSTACLE RECOGNITION FOR PATH PLANNING (71) Applicant: Google LLC, Mountain View, CA (US)

(72) Inventors: David Millard, San Francisco, CA (US); Mikael Persson, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,738

(22) Filed: Jul. 25, 2022

(65) Prior Publication Data

US 2022/0365532 A1 Nov. 17, 2022

Related U.S. Application Data (63) Continuation of application No. 16/832,837, filed on Mar. 27, 2020, now Pat. No. 11,429,103, which is a (Continued)

(51) Int. Cl.
*G05D 1/00* (2006.01)
*B25J 9/00* (2006.01)
(Continued)

(52) U.S. Cl.
CPC .......... *G05D 1/0088* (2013.01); *B25J 9/0003* (2013.01); *B25J 9/1666* (2013.01);
(Continued)

(58) Field of Classification Search
CPC .. G05D 1/0088; G05D 1/0214; G05D 1/0217; G05D 1/0221; G05D 1/024;
(Continued)

(56) References Cited

U.S. PATENT DOCUMENTS 8,214,079 B2 7/2012 Lee et al.
8,396,254 B1 2/2013 Hickman
(Continued)

OTHER PUBLICATIONS

Stanford.edu [online] "PointNet: Deep learning on point sets for 3D classification and segmentation" Qi et al., Stanford University Presentation, 2017, [retrieved on Dec. 19, 2017] Retrieved from Internet: URL<http://stanford.edu/~rqi/pointnet/docs/cvpr1 7 pointnet_slides.pdf> 68 slides.
(Continued)

*Primary Examiner* — Tyler D Paige
(74) *Attorney, Agent, or Firm* — McDonnell Boehnen Hulbert & Berghoff LLP (57) ABSTRACT Systems, methods, devices, and techniques for planning travel of an autonomous robot. A system identifies one or more obstacles that are located in proximity of at least a portion of a planned route for the autonomous robot. For each obstacle, the system: (i) determines a semantic class of the obstacle, including selecting the semantic class from a library that defines a set of multiple possible semantic classes for obstacles, and (ii) selects a planning policy for the obstacle that corresponds to the semantic class of the obstacle. The system can generate a trajectory along the at least the portion of the planned route using the selected planning policies. The robot can then initiate travel according to the trajectory.

18 Claims, 7 Drawing Sheets

Related U.S. Application Data continuation of application No. 15/847,108, filed on Dec. 19, 2017, now Pat. No. 10,606,269.

(51) Int. Cl.
　　*B25J 9/16*　　　　(2006.01)
　　*G01C 21/20*　　　(2006.01)
　　*G01C 21/34*　　　(2006.01)
　　*G06V 20/10*　　　(2022.01)

(52) U.S. Cl.
　　CPC ........... *G01C 21/20* (2013.01); *G05D 1/0214* (2013.01); *G05D 1/0217* (2013.01); *G05D 1/0221* (2013.01); *G05D 1/024* (2013.01); *G05D 1/0246* (2013.01); *G05D 1/0274* (2013.01); *G06V 20/10* (2022.01); *G01C 21/3453* (2013.01); *G05D 1/0223* (2013.01); *Y10S 901/01* (2013.01); *Y10S 901/47* (2013.01)

(58) Field of Classification Search
　　CPC .. G05D 1/0246; G05D 1/0274; G05D 1/0223; B25J 9/0003; B25J 9/1666; G01C 21/20; G01C 21/3453; G01C 21/206; G06V 20/10; Y10S 901/01; Y10S 901/47
　　USPC .......................................................... 701/23
　　See application file for complete search history.

(56) References Cited

U.S. PATENT DOCUMENTS

| | | | |
|---|---|---|---|
| 8,432,443 | B2 | 4/2013 | Nam et al. |
| 8,825,266 | B2 | 9/2014 | Naderhirn et al. |
| 9,129,148 | B1 | 9/2015 | Li et al. |
| 9,574,883 | B2 | 2/2017 | Watts et al. |
| 9,717,387 | B1 | 8/2017 | Szatmary et al. |
| 9,751,212 | B1 | 9/2017 | Martinson et al. |
| 10,606,269 | B2 * | 3/2020 | Millard ............... B25J 9/1666 |
| 11,429,103 | B2 * | 8/2022 | Millard ............... B25J 9/0003 |
| 2003/0059106 | A1 | 3/2003 | Gutta |
| 2014/0222279 | A1 | 8/2014 | Stout et al. |
| 2014/0350725 | A1 | 11/2014 | Lafary et al. |
| 2014/0365258 | A1 | 12/2014 | Vestal et al. |
| 2016/0188977 | A1 | 6/2016 | Kearns et al. |
| 2017/0241790 | A1 | 8/2017 | Yoshikawa |
| 2017/0249504 | A1 | 8/2017 | Martinson et al. |
| 2018/0118337 | A1 | 5/2018 | Viel |
| 2019/0049978 | A1 | 2/2019 | Brede et al. |
| 2019/0187703 | A1 | 6/2019 | Millard et al. |
| 2020/0225673 | A1 | 7/2020 | Ebrahimi Afrouzi et al. |

OTHER PUBLICATIONS

Www.qualcomm.com [ online] "Finding Objects in Cluttered Scenes for Home Robotics," Jim Little, Presentation in Laboratory for Computational Intelligence Computer Science, UBC Vm1couver, [retrieved on Dec. 19, 2017] Retrieved from Internet:.URL<https://www.qualcomm.com/media/ .. ./augme11ted-reality-lecture-se1ies-jim-little.pdf> 91 slides.

Althaus et al., "Behavior Coordination in Structured Environments," Advanced Robotics, Jan. 1, 2003, 19 pages, vol. 17, No. 7.

Anati, Roy Corrado, "Semantic Localization and Mapping in Robot Vision," University of Pennsylvania, Scholarly Commons, Publicly Accessible Penn Dissertations, 1587, Jan. 1, 2016, 172 pages.

Buschka et al., "A Virtual Sensor for Room Detection," IEEE/RSJ International Conference on Intelligent Robots and Systems, 2002, pp. 637-642, vol. 1.

Choi et al., "Automated Space Classification for Network Robots in Ubiquitous Environments," Journal of Sensors, vol. 2015, Article ID 954920, 2015, 9 pages.

Cosgun et al., "Context Aware Robot Navigation using Interactively Build Semantic Maps," arXiv1710.08682v1, Oct. 24, 2017, 19 pages.

Espinance et al., "Indoor scene recognition by a mobile robot through adaptive object detection," Robotics and Autonomous Systems, Sep. 30, 2013, pp. 932-947, vol. 61, No. 9.

Garcia-Garcia et al., "A Review on Deep Learning Techniques Applied to Semantic Segmentation," arXiv1704.06857v1, Apr. 22, 2017, 23 pages.

Gomez et al., "Fast marching solution for the social path planning problem," IEEE International Conference on Robotics and Automations, May 2014, 6 pages.

Guo et al., "3D Mesh Labeling via Deep Convolutional Neural Networks," ACM Transactions on Graphics, Dec. 29, 2015, 12 pages, vol. 35, No. 1.

International Bureau, International Preliminary Report on Patentability dated Jun. 23, 2020, issued in connection with International Patent Application No. PCT/US2018/065491, 8 pages.

International Searching Authority, International Search Report and Written Opinion dated Mar. 29, 2019, issued in connection with International Patent Application No. PCT/US2018/065491, 15 pages.

Koenig et al., "Xavier: A Robot Navigation Architecture Based on Partially Observable Markov Decision Process Models," Artificial Intelligence Based Mobile Robotics: Case Studies of Successful Robot Systems, May 1998, 24 pages.

Kuipers et al., "Bootstrap Learning for Place Recognition," In Proceedings of the 18th National Conference on Artificial Intelligence, Jul. 2002, 7 pages.

Maturama et al., "VoxNet: A 3D Convolutional Neural Network for Real-Time Object Recognition," IEEE/RSJ International Conference on Intelligent Robots and Systems, Sep. 28, 2015, 7 pages.

McCormac et al., "SemanticFusion: Dense 3D Semantic Mapping with Convolutional Neural Networks," arXiv 1609.05130, Sep. 16, 2016, 8 pages.

Mozos, Oscar Martinez, "Semantic Labeling of Places with Mobile Robots," Heidelberg: Springer, Feb. 4, 2010, 176 pages, vol. 61.

Paszke et al., "ENet: A Deep Neural Network Architecture for Real-Time Semantic Segmentation," Under review as a conference paper at ICLR, arXiv preprint arXiv 1606.0214 7, Jun. 2017, 10 pages.

Pronobis et al., "A realistic benchmark for visual indoor place recognition," Robotics and Autonomous Systems, Jan. 31, 2010, pp. 81-96, vol. 58, No. 1.

Pronobis et al., "Multi-modal Semantic Place Classification," The International Journal of Robotics Research, Feb./Mar. 2010, pp. 298-320, vol. 29, Nos. 2-3.

Qi et al., "PointNet: Deep Learning on Point Sets for 3D Classification and Segmentation," Conference on Computer Vision and Pattern Recognition, 2017, 4 pages.

Ribes et al., "Object-based Place Recognition for Mobile Robots Using Panoramas," Proceedings of the 11th International Conference of the Catalan Association for Artificial Intelligence, Oct. 15, 2008, 8 pages, vol. 184.

Rottmann et al., "Semantic Place Classification of Indoor Environments with Mobile Robots using Boosting," AAAI, Jul. 9, 2005, 6 pages, vol. 5.

Rusu et al., "Model-based and Learned Semantic Object Labeling in 3D Point Cloud Maps of Kitchen Environments," IEEE/RSJ International Conference on Intelligent Robots and Systems, Oct. 10, 2009, 8 pages.

Sisbot et al. "A Human Aware Mobile Robot Motion Planner," IEEE Transaction on Robotics, Oct. 2007, 10 pages, vol. 23, No. 5.

Torralba et al. "Context-based vision system for place and object recognition," IEEE, Null., Oct. 13, 2003, 8 pages.

Vasudevan et al., "Cognitive maps for mobile robots—an object based approach," Robotics and Autonomous Systems, Jan. 2007, pp. 359-371, vol. 55.

Wang et al., "Scene Classification with Deep Convolutional Neural Networks," Semantic Scholar, [retrieved on Dec. 19, 2017] Retrieved from Internet: URL< https://yzhwang.github.io/ecs289hvision.pdf> 7 pages.

(56) References Cited

OTHER PUBLICATIONS

Yu et al., "CASENet: Deep Category-Aware Semantic Edge Detection," arXiv 1705.09759v1, May 27, 2017, 16 pages.

* cited by examiner

SEMANTIC OBSTACLE RECOGNITION FOR PATH PLANNING

CROSS-REFERENCE TO RELATED DISCLOSURES

This application is a continuation of U.S. patent application Ser. No. 16/832,837, filed Mar. 27, 2020, which claims priority to U.S. patent application Ser. No. 15/847,108, filed Dec. 19, 2017, each of which are incorporated herein by reference in their entirety.

BACKGROUND

This specification generally relates to autonomous navigation, such as for a mobile robot.

Robotic devices have helped to automate tasks involving physical actions in a range of settings from factories and office spaces, to homes. Autonomous robots have been developed that are capable of performing tasks with little to no human supervision. Autonomous robots can also be mobile and are capable of navigating an environment with little or no human supervision. For example, an autonomous robot may roam designated areas of a home or office to clean, pick up and re-arrange items, or perform other sophisticated tasks. The autonomous robot may include sensors that allow it to sense information about the environment, such as information that is useful in navigating or performing other tasks in the environment.

SUMMARY

This specification discloses systems, methods, devices, and other techniques for navigating an autonomous robot through an environment. A system operating an autonomous robot can include a planning engine. The planning engine is configured to plan a route for the robot to navigate to a specified location in the environment, as well as to plan a specific path for the robot to travel along the route.

Moreover, the planning engine can identify objects in the robot's environment that could interfere with the robot's movement along the route, including fixed obstacles (e.g., furniture) and dynamic obstacles (e.g., people or pets). The planning engine is optimized to generate a path for the robot that circumvents the obstacles and complies with any specific travel constraints associated with the obstacles. In particular, the system can determine semantic classes for obstacles detected in the environment, and a respective planning policy can be identified for each obstacle that corresponds to the obstacle's semantic class. The planning policy for a given obstacle defines constraints for the robot's movement relative to the obstacle, such as how close the robot may maneuver next to the obstacle.

Obstacles from different semantic classes may have different constraints that reflect different practical and social considerations for how the robot is permitted to move relative to an obstacle. For example, a person may expect a wider buffer zone between himself or herself and the robot than is necessary for furniture or plants in the environment. Accordingly, the planning policies for these different semantic classes may impose varying costs for the robot to travel at different proximities relative to objects in the semantic classes. For instance, a higher cost may be imposed to travel in close proximity to a person than a bed frame or a potted plant, such that the planning engine would be biased to select a route that diverts the robot further away from people than from objects in some other semantic classes. In another example, the planning policy for sensitive objects (e.g., a china cabinet) may impose a higher cost in regulating the robot's speed in proximity of the object than more durable objects such as a sofa.

Some implementations of the subject matter described herein include a computer-implemented method performed by a computing system that can, for example, include at least a portion located on an autonomous robot. The method can include identifying one or more obstacles that are located in proximity of at least a portion of a planned route for the autonomous robot. For each obstacle, the system: (i) determines a semantic class of the obstacle, including selecting the semantic class from a library that defines a set of multiple possible semantic classes for obstacles, and (ii) selects a planning policy for the obstacle that corresponds to the semantic class of the obstacle. The planning policy can describe at least one constraint with respect to travel of the autonomous robot relative to the obstacle. The system can generate a trajectory along the at least the portion of the planned route for the autonomous robot based on the constraints described by the planning policies for the one or more obstacles located in proximity of the at least the portion of the planned route. The robot can then initiate travel by following at least a beginning portion of the trajectory.

These and other implementations can optionally include one or more of the following features.

The library can store data identifying a respective planning policy for each semantic class of the set of multiple possible semantic classes. The respective planning policies for at least a subset of the set of multiple possible semantic classes describe different constraints from each other.

At least one constraint described by the planning policy for the obstacle can be or include a cost function that defines a cost of travel of the autonomous robot as a function of a distance between the autonomous robot and the obstacle during the travel of the autonomous robot.

The cost function can further define the cost of travel of the autonomous robot as a function of a speed of the autonomous robot at various distances from the obstacle during the travel of the autonomous robot.

Generating the trajectory along the at least the portion of the planned route for the autonomous robot can include determining a trajectory that optimizes a trajectory cost function, the trajectory cost function being based on the respective cost functions for the one or more obstacles located in proximity of the at least the portion of the planned route.

The library can store data indicating a hierarchical representation of the set of multiple possible semantic classes.

Selecting the semantic class of the obstacle can include traversing the hierarchical representation of the set of multiple possible semantic classes to locate a most-specific semantic class for the obstacle.

The most-specific semantic class for the obstacle can identify the obstacle as a particular instance of an object within a higher-level semantic class for the obstacle.

The semantic class of a first obstacle of the one or more obstacles that are located in proximity of the at least the portion of the planned route for the autonomous robot can identify the first obstacle as a person.

The semantic class of a second obstacle of the one or more obstacles that are located in proximity of the at least the portion of the planned route for the autonomous robot can identify the second obstacle as an inanimate object.

After initiating travel of the autonomous robot according to the trajectory, but before completing the travel, the system can generate an updated trajectory. The robot can initiate travel of the autonomous according to the updated trajectory (e.g., by following the updated trajectory until an intervening event occurs such as generation of a further updated trajectory) before completing the travel of the autonomous robot according to the trajectory.

Identifying the one or more obstacles that are located in proximity of the at least the portion of the planned route for the autonomous robot can include detecting the one or more objects in a representation of an environment of the autonomous robot, the representation of the environment generated using sensor data from one or more sensors of the autonomous robot, the one or more sensors including at least one of a camera system or a light detection and ranging (LIDAR) system.

Any of the computer-implemented methods and processes described herein can be embodied in a computer program product that is stored as instructions on one or more computer-readable media. One or more processors may access the instructions from the computer-readable media and execute them, thereby causing the processors to perform operations corresponding to the methods and processes defined therein.

Some implementations of the subject matter described in this specification can, in certain instances, realize one or more of the following advantages. A path for an autonomous robot can be planned that protects against the risk of collisions with obstacles in the environment. Additionally, the robot may modify its travel behavior around objects from different semantic classes, thereby enabling the robot to respect social considerations and specialized constraints for different types of objects that the robot may encounter. Moreover, selecting planning policies for obstacles according to their semantic classes can be an efficient and effective way to differentiate obstacles in the environment and tailor how the robot travels with respect to those obstacles. For example, relatively small amounts of data and storage space may be required to associate an object with a semantic class. The planning policy for an obstacle may also be located relatively quickly by searching for the object's semantic class in a library of policies, rather than searching for more specific features of a particular instance of an object. Additionally, by applying planning policies based on an object's semantic class, latency can be shortened between the time at which new objects are discovered or the observed state or geometry of an existing object is updated, and the time at which an appropriate planning policy is applied to modify the robot's path. By reducing latency in this manner, the reactivity of the robot to objects of different semantic classes in the environment can be improved.

The details of one or more embodiments are set forth in the drawings and the detailed description below. Additional features and advantages will be apparent to those of ordinary skill in the field to which the invention pertains.

DESCRIPTION OF DRAWINGS

Like references and numerals in the various drawings indicate like elements.

DETAILED DESCRIPTION

This specification describes systems, methods, devices, and other techniques for planning paths (also referred to herein as 'trajectories') for an autonomous device, such as a robot, to travel in an environment. Autonomous robots can be mobile, such that they are capable of moving about an environment in which they are located without explicit human control. However, to operate effectively in many environments, the robot must have capacity to avoid collisions with other objects in the environment, and also to navigate in a "socially acceptable" manner that is tolerated by individuals who also work, live, or play in the environment. The techniques described herein use semantic information about objects in the robot's environment to plan a path through the environment that optimizes one or more travel objectives for the robot relative to the identified objects. In this way, the robot may avoid collisions, but may adjust its travel speed, distance, or other behaviors around objects in the environment based on policies assigned to corresponding semantic classes for the identified objects. For example, the planning policy for a potted plant may permit the robot to travel in close proximity to the plant with relatively high speed, whereas the planning policy for a person in the environment may provide a relatively large buffer zone around the person that attaches a high cost for the robot to encroach upon, reflecting that the robot should not unnecessarily intrude on an individual's personal space during the course of its travel.

Figure 1A:
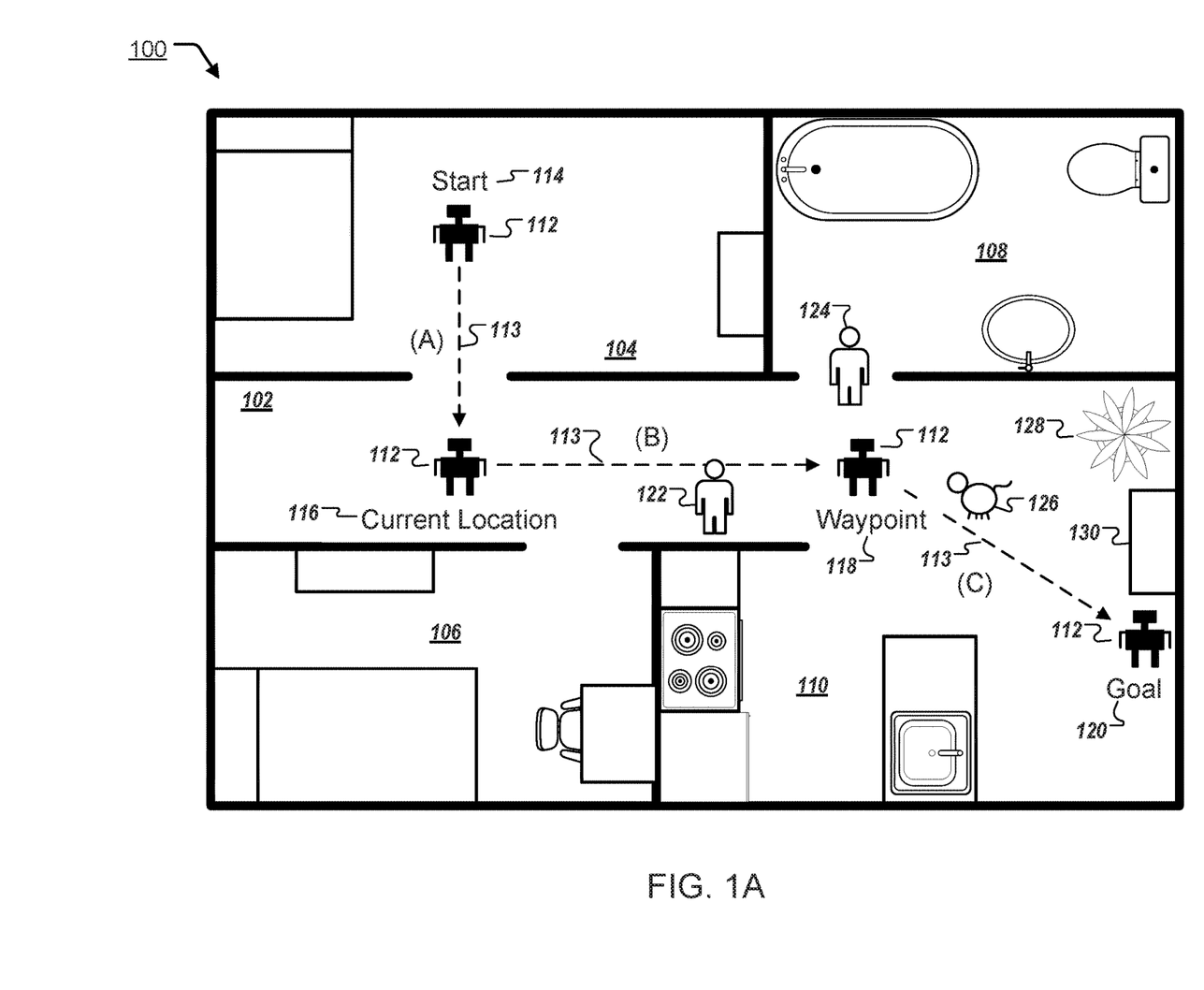
FIG. 1A is a conceptual diagram of an example environment of an autonomous robot.

Referring to FIG. 1A, a conceptual diagram is depicted of an example environment 100 for an autonomous robot 112. In this example, the environment 100 is the interior of a house that the robot 112 is configured to operate in. The robot 112 may move about the house and carry out various tasks such as floor and surface cleaning, organizing, moving objects, picking up and dropping off objects at specified locations, interacting with occupants or other persons in the house, and responding to specific requests from such persons. In general, the robot 112 is configured to move about the environment autonomously. Rather than following pre-defined paths or operating under human control, the robot 112 can include various sensors that detect information about its environment 100, which can be processed in real-time to locate the robot 112 and to chart a path for the robot 112 through the environment 100 in a safe and accommodating manner. In some implementations, the robot 112 is configured to operate in other types of environments rather than or in addition to a home environment, such as an office, a factory, a warehouse, a retail store, an outdoor environment, or a combination of these.

To facilitate navigation through the environment 100, the robot 112 can include a planning engine, or access a remote planning engine, that determines how the robot 112 should travel toward a goal location 120. Planning the robot's travel can broadly occur into two phases: global planning and local planning. Global planning refers to the process of determining a navigable route from a starting or current location of the robot to the goal location 120, i.e., the destination location to which the robot 112 is tasked to travel. Local planning involves determining a more precise path or trajectory along the planned route that allows the robot to reach the goal location 120. As an example, FIG. 1A shows a planned route 113 that can be generated by a global planner given the robot's starting location 112, goal location 120, and a map of the robot's environment (e.g., a map representing the interior of the home environment 100). The global planner determines that the robot 112 can travel to the goal location 120 by heading along a first segment (A) of the route 113 from bedroom 104 to the hallway 102. The planned route 113 indicates the robot 112 should then take a left turn to head down the hallway 102 until it reaches waypoint 118, at which point it can veer right across the living room and kitchen area 110 to the goal location 120. The route provided by the global planner thus provides high-level instructions or directions for the robot 112 to navigate the environment 100 to a goal 120.

Although the global planner generates a route that indicates high-level instructions for navigating the robot 112, the route itself may be insufficient for the robot 112 to travel to the goal location 120 as a practical matter. Any number of obstacles may be present in the vicinity of the route, which the robot 112 must either maneuver around or have moved so as to reach the goal location 120. For example, several obstacles are located near the route 113, including a first person 122, a second person 124, a pet 126, a potted plant 128, and a desk 130. Additionally, the walls and other structural features of the environment 100 define physical boundaries for the robot's 112 movements. In some implementations, the global planner may not account for, or even be aware of, the presence of certain obstacles in the environment 100 in generating the planned route. For instance, the global planner may be configured to draw the planned path down the center of each region of the environment 100 based on a map of the environment, regardless of any obstacles present in the region. Thus, the planned route 113 is nominally placed in the center of hallway 102, despite the presence of first person 122 in the left-center portion of the hallway 102. If the robot 112 blindly followed the route 113, it would risk a collision with the first person 122, or would at least risk intruding uncomfortably in the personal space of the first person 122 (also increasing the risk of injury to the first person 122).

Accordingly, the robot 112 can use a local planner to refine the precise path or trajectory that it uses to maneuver in the environment 100, while still following the route 113 to reach goal location 120. The robot 112 can be equipped with sensors, such as a stereoscopic camera, light detection and ranging system (LIDAR), or both, which scan a region of the environment 100 within view of the robot 112 to identify obstacles presently located in the environment 100 along the planned route 113. The local planner can then chart the path for the robot 112 to circumvent the obstacles. If an adequate path cannot be achieved that permits the robot 112 to safely travel along a given route 113, the global planner may attempt to generate a new route that detours around a blocked portion of the initial route 113, the robot 112 may request assistance from other robots or humans to remove the obstacles, the robot 112 may wait for the blocked portion to clear, and/or an error may be thrown. For example, to avoid first person 122, the robot 112 may follow a path generated by the local planner that deviates from the center of hallway 102 to divert left of first person 122. To avoid the pet 126, the robot 112 may follow a path generated by the local planner that diverts right of the pet 126, underneath the third segment (C) of the planned route 113. Because some obstacles in the environment 100 are mobile (e.g., persons 122 and 124 or pet 126), and the location or presence of objects in the environment 100 may change over time, the robot 112 may constantly scan and update its model of the environment 100, and the planned path can be updated on a periodic basis in view of the model and the most recent indications of the locations of obstacles in the environment 100.

Figure 1B:
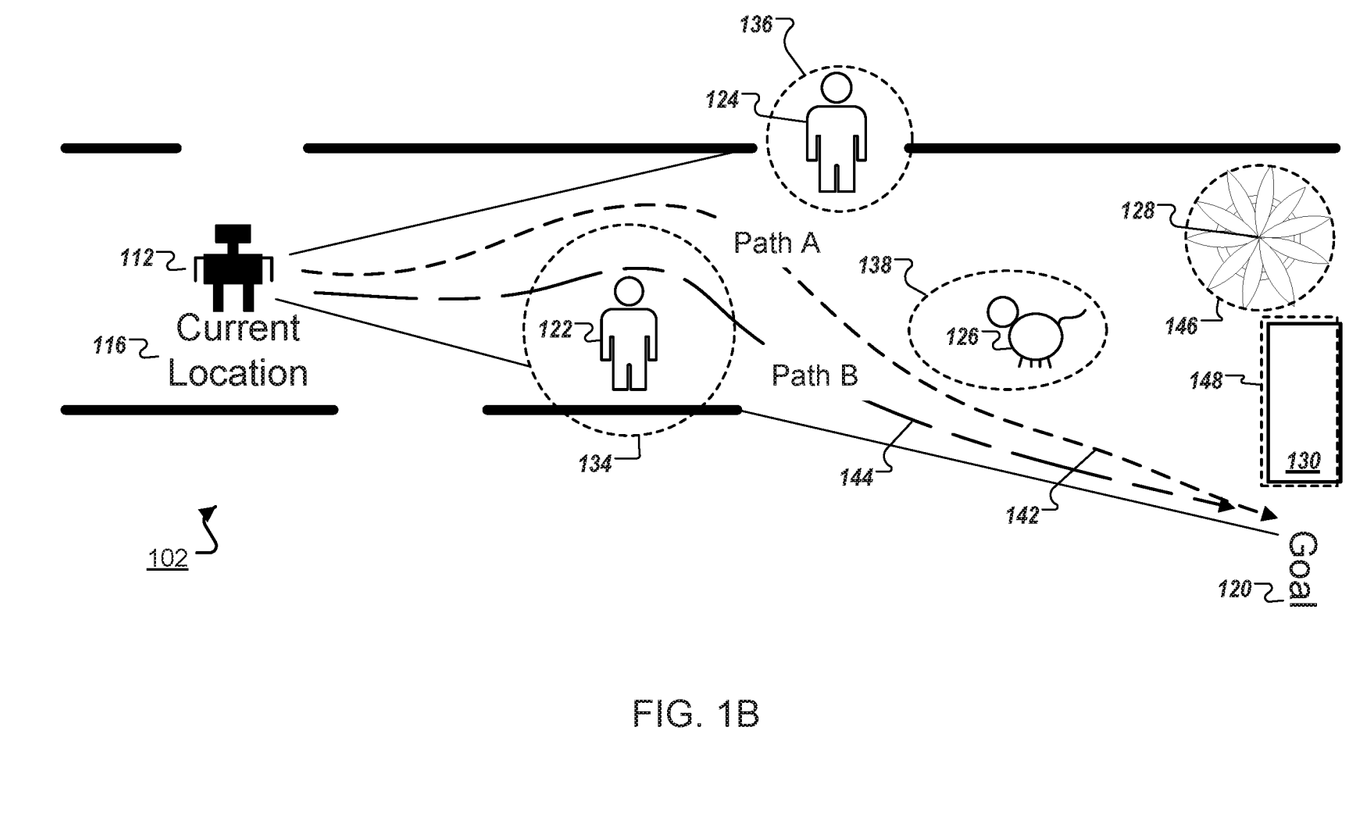
FIG. 1B shows a zoomed-in view of a portion of the environment represented in FIG. 1A.

FIG. 1B shows a zoomed-in view of the hallway 102 from the environment 100 of FIG. 1A, at a particular time when the current location 116 of the robot 112 is at the junction of segments (A) and (B) of the planned route 113. At this time, the robot 112 has already traversed the first segment (A) of the route 113 to exit bedroom 104, but the robot 112 has yet to travel the following segments (B) and (C) to reach goal location 120 at the far wall of the living room and kitchen region 110. To reach the goal location 120, a local planner generates a path for the robot 112 to follow along the route 116.

In some implementations, the robot's path is optimized to minimize costs associated with traveling near other objects in the environment 100 that are located along the route 113. Each obstacle or other object in the environment 100 can be assigned a planning policy that defines one or more constraints with respect to travel of the robot 112 relative to the obstacle. In some implementations, constraints defined by the planning policy for an obstacle include minimal distances that the robot 112 is permitted to operate from the obstacle, maximum speeds that the robot 112 is permitted to operate at one or more distances from the obstacle, or a combination of these. As an example, FIG. 1B shows several obstacles that the robot 112 should navigate around in traveling from its current location 112 to the goal location 120, including first person 122, second person 124, and pet 126. Each of these obstacles 122, 124, and 126 is assigned a planning policy that imposes constraints on the robot's travel. These constraints are graphically represented as buffer zones 134, 136, and 138 around obstacles 122, 124, and 126, respectively. The boundaries of the buffer zones 134, 136, and 138 are drawn a distance from the respective obstacles 122, 124, and 126 that corresponds to a threshold planning cost for the robot's travel relative to the obstacles 122, 124, and 126. Conceptually, the boundaries of the buffer zones 134, 136, and 138 indicate minimally acceptable distances for the robot's travel relative to the obstacles 122, 124, and 126, respectively. In other words, the buffer zones 134, 136, and 138 ensure that the robot 112 does not travel within a threshold distance of obstacle 122, 124, and 126 (or at least impose a high cost for doing so), thereby reducing the risk of collisions and respecting the space around humans, pets, and other obstacles.

Two possible paths 142, 144 for the robot 112 are depicted in FIG. 1B. Path A (142) complies with the constraints defined by the respective planning policies for each of the obstacles 122, 124, 126, 128, and 130, because the path 142 circumvents the respective buffer zones 134, 136, 138, 146, and 148 around the obstacles 122, 124, 126, 128, and 130. In contrast, Path B (144) does not comply with the constraints defined by the respective planning policies of all the obstacles 122, 124, 126, 128, and 130. In particular Path B (144) violates the minimally acceptable travel distance around the first person 122 since Path B (144) cuts across that person's buffer zone 134. Because the first Path A (142)

complies with the constraints imposed by the planning policies of local objects in the robot's environment, but the second Path B (144) does not, the local planner selects to initiate travel of the robot along the first Path A (142) rather than the second Path B (144).

In some implementations, the local planner generates many (e.g., tens, hundreds, or thousands) of candidate paths for the robot 112. The planner evaluates each candidate path with respect to a path cost function (also referred to as a trajectory cost function), and adopts one of the candidate paths on which to initiate travel that optimizes the path cost function, e.g., by selecting a candidate path minimizes a cost that results from evaluating the path cost function. The travel cost of a candidate path quantifies the path's compliance with constraints imposed by the planning policies of any obstacles in the vicinity of the path, along with the path's compliance with any additional constraints or other features (e.g., travel time, distance, and deviation from route). An obstacle may be deemed in vicinity of a path if it is located within a threshold distance of the path or if the boundary of a buffer zone for the obstacle crosses or is within a threshold distance of the path. In some implementations, the path cost function is a weighted combination of, or is otherwise based on, individual obstacle cost functions for obstacles in the robot's environment generally or obstacles in the vicinity of the path. The obstacle cost function for an obstacle defines a cost of the robot's travel relative to the obstacle as a function of one or more characteristics of the travel, such as the robot's distance to the obstacle, the robot's speed relative to its distance to the obstacle, or a combination of these. In some implementations, the planning policy for an obstacle expresses the travel constraints for the robot with respect to the obstacle in terms of an obstacle cost function.

Obstacle cost functions may assume any suitable form. In some implementations, the obstacle cost function defines one or more zones around an obstacle that correspond to different costs of the robot 112 traveling within the different zones. For example, a first zone may be defined by the region surrounding an obstacle at less than a radius $r_1$ from the obstacle, a second zone may be defined by the region surrounding the obstacle from radius $r_1$ to radius $r_2$ ($r_2 > r_1$), and a third zone may be defined by the region surrounding the obstacle at greater than radius $r_3$ ($r_3 > r_2$). The first zone may have the highest cost attached, the second zone may have a lower cost attached, and the third zone may have the lowest cost attached, to reflect that travel closest to the obstacle (in zone 1) is to be avoided, travel in moderate proximity of the obstacle (in zone 2) is more preferable, and travel furthest from the obstacle (in zone 3) is most preferable. Other linear or non-linear obstacle cost functions may also be adopted, such as polynomial, logarithmic, geometric, or exponential functions that map one or more characteristics of the robot's travel (e.g., distance, speed) to a cost value. The path cost function may combine individual cost functions for multiple obstacles in the robot's environment or in a vicinity of the path of the robot 112 to generate a travel cost score representing a cost for the robot's travel along the entire path. For example, the travel cost function may assign a higher cost to the robot's travel if it crosses the buffer zones for two obstacles rather than one, according to the individual cost functions of the obstacles.

In some implementations, the robot 112 is configured to analyze the environment 100 and determine semantic classes for obstacles in the environment 100. The planning policy assigned to the obstacles can then correspond to their respective semantic classes. A semantic class generally refers to a class of objects (e.g., obstacles) that share a semantic feature, e.g., in that they relate to a common real-world concept. Semantic classes may have labels that describe the semantic feature of the class, and in some implementations the system may label objects detected in the environment 100 with the corresponding label for the object's semantic class. For example, the robot 112 may use a camera system, LIDAR system, and/or other sensors to scan its environment 100 and detect objects in the environment 100. Based on physical characteristics of the objects, and potentially other information (e.g., the locations of the objects in the environment and their relationships to other objects), the system may recognize the objects and determine a semantic class for the object. The objects may be labeled according to their semantic class. For example, objects 122 and 124 may be labeled as "persons," object 126 may be labeled as a "pet," object 128 may be labeled as a "plant," and object 130 may be labeled as a "desk." By determining semantic classes for objects in the environment 100, the robot 112 can acquires a conceptual understanding of the environment 100, which in turn can facilitate its ability to perform various items such as task recognition based on natural language inputs. Moreover, as described herein, the robot 112 or an associated system may select planning policies for objects detected in the environment 100 based on information about the semantic classes of the objects.

Planning policies may be specific to a given semantic class. In some implementations, different semantic classes of objects are assigned different planning policies, so as to reflect differences in how the robot 112 may travel with respect to different types of obstacles. Differences in planning policies among obstacles 122, 124, 126, 128, and 130 are shown by the different sizes and shapes of buffer zones 134, 136, 138, 146, and 148. For example, the primary consideration for the robot 112 in navigating around the potted plant 128 may be collision avoidance, but there is little need to provide a wide buffer zone 146 around the plant 128. Accordingly, the buffer zone 146 surrounding the plant 128 is relatively narrow. In contrast, humans are likely to be annoyed if the robot 112 travels too closely and encroaches on their personal space. Additionally, people are typically not fixed to particular locations and may make sudden, unexpected movements. Accordingly, the planning policies for humans may provide wider buffer zones than would be afforded to the plant 128 or some other inanimate objects. For instance, it would be more costly for the robot 112 to travel in very close proximity to either person 122, 124 than it would be for the robot 112 to travel at such close proximity to the potted plant 128. In some implementations, different instances of an object within a same high-level semantic class may be assigned different planning policies to reflect different preferences for the robot's interactions with each object. For example, persons 122 and 124 both have wider buffer zones than the potted plant 128 or the desk 130, but the buffer zones 134, 136 for each person 122, 124 respectively are sized differently from each other. A wider buffer zone 134 for the first person 122 affords the first person 122 greater space from the robot 112 than the second person 124 is afforded.

Figure 2:
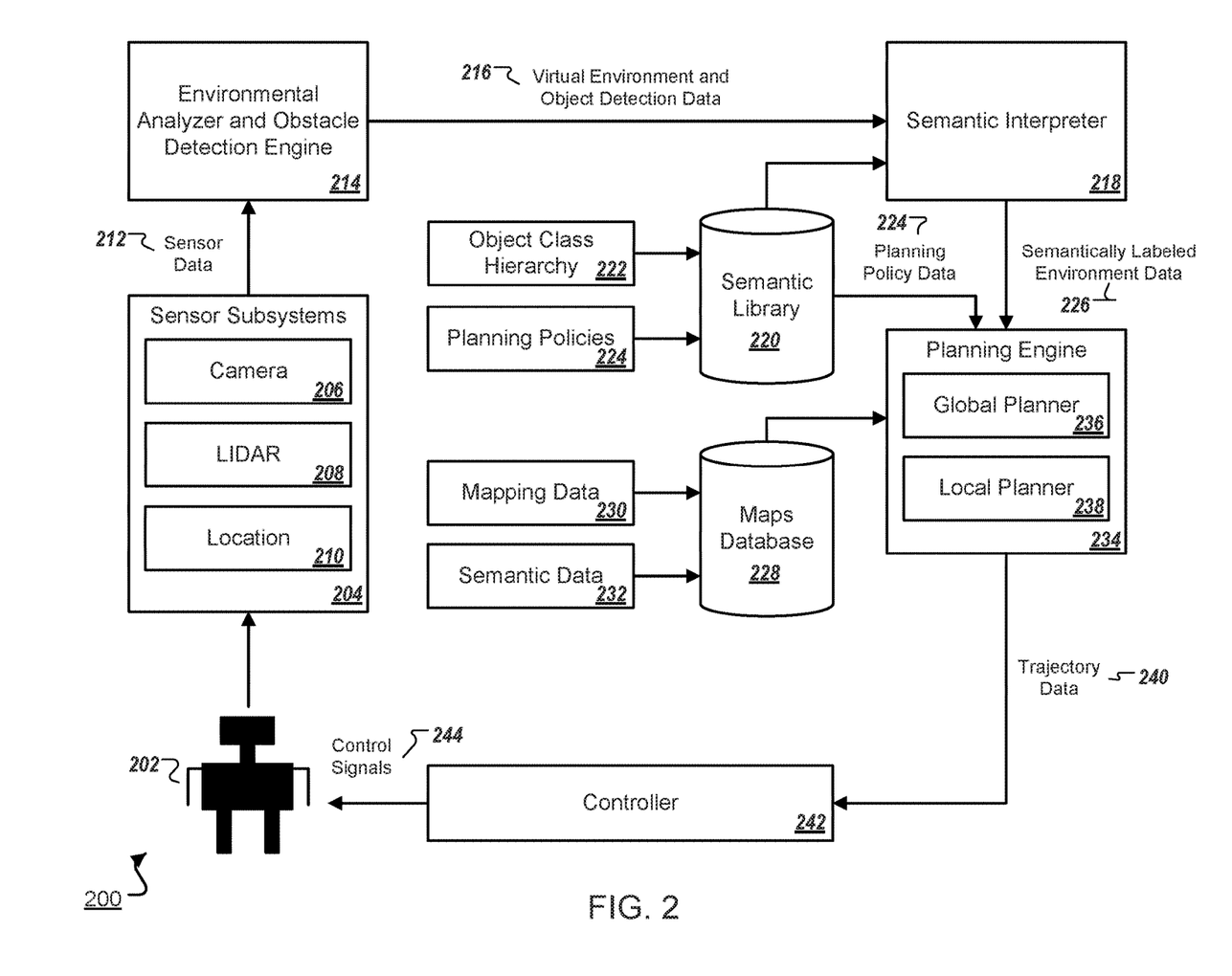
FIG. 2 depicts a block diagram of an example computing system configured to plan and execute trajectories of an autonomous robot.

Referring now to FIG. 2, a computing system 200 is shown for planning and executing travel of an autonomous robot 202. The system 200 can include one or more computers in one or more locations. In some implementations, the system 200 is entirely integrated in the robot 202. In other implementations, particular components of the system 200 may be separate from the robot 202, and may be located in either the same environment as the robot 202 or in a remote environment. For example, the robot 202 may access components 214, 218, 220, 228, and/or 234 remotely via the Internet or other networks. The system 200 may be configured to carry out operations discussed with respect to FIGS. 1A and 1B, and the process 500 described with respected to FIG. 5.

The robot 202 is an autonomous robot that is capable of moving about an environment and performing tasks within the environment. Being autonomous, the robot may respond to human requests and perform actions on behalf of humans, but its navigation is performed substantially independent of human or operator control.

The robot 202 can include one or more sensor subsystems 204. The sensor subsystems 204 allow the robot 202 to collect information about the environment where it is located. This information can be processed and analyzed for various purposes, including to identify objects in the environment and to navigate about the environment. In some implementations, the robot 202 includes a camera system 206. The camera system 206 captures images and/or video of the robot's environment. The camera system 206 can be adapted to capture images and/or video with depth information that indicates distances of objects from the robot in the environment. For example, the camera system 206 may include a stereoscopic camera. In some implementations, the robot 202 includes a LIDAR system that uses light detection and ranging techniques to determine distances of objects from the robot in the environment. In some implementations, the robot 202 includes location sensors 210 such as GPS that allow the robot 202 to ascertain its geographic location and, in some examples, its micro-position within the environment (e.g., a particular location within a residence or office environment). The sensor subsystems 204 generate sensor data 212 characterizing signals captured by all or some of the sensor subsystems 204.

The system 200 further includes an environmental analyzer and obstacle detection (EAOD) engine 214. The EAOD engine 214 is configured to generate a virtual environment representing all or a portion of the physical environment in which the robot 202 is currently located. In some implementations, the virtual environment is a three-dimensional (3D) representation of the robot's physical environment. The EAOD engine 214 can interpret sensor data 212 from the sensor subsystems 204, mapping data 230 from the maps database 228, or a combination of these and other data to render the virtual environment. The EAOD engine 214 can also execute object detection algorithms to identify the presence of obstacles and other objects in the environment. Detected objects from the robot's physical environment may be represented in the virtual environment by a 2D or 3D bounding region that approximates the size, and, optionally, the shape, of the detected object. The bounding regions can be positioned in the virtual environment at virtual locations that correspond to their actual locations in the physical real-world environment. The robot 202 can also be represented in the virtual environment at a virtual location corresponding to its current location in the real-world environment. In this way, the relative positions and distances between the robot 202 and other objects in the real-world environment are represented in the virtual environment. In some implementations, the EAOD engine 214 includes a deep neural network that processes sensor data 212 (e.g., LIDAR or camera images), and optionally mapping data 230, to detect objects in the environment. The deep neural network may also be used to estimate the locations of objects and to determine bounding regions (e.g., bounding boxes) for the objects. The EAOD engine 214 generates virtual environment and object detection data 216 that represents the virtual environment and characteristics of objects detected in the environment.

Figure 3:
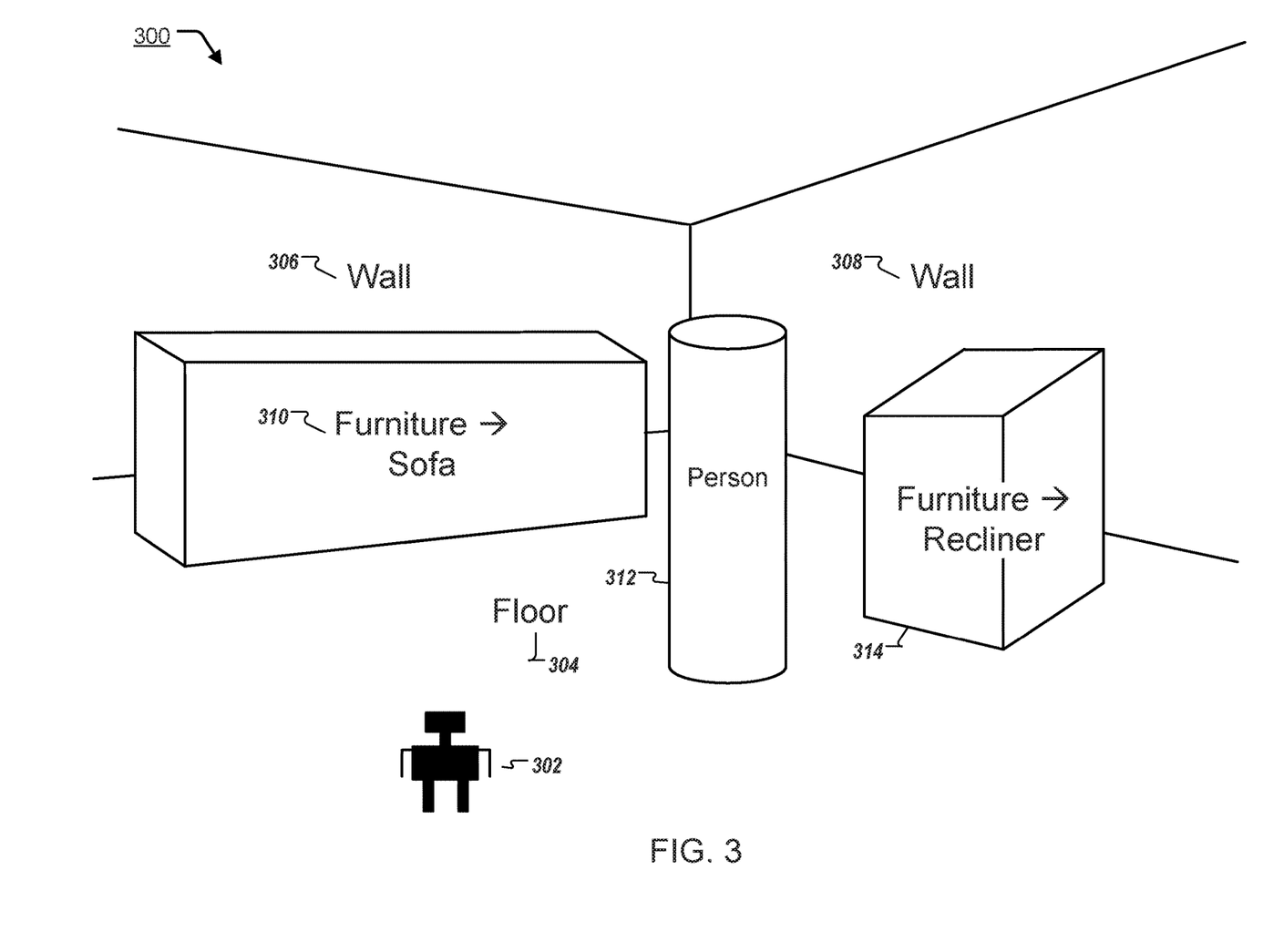
FIG. 3 is a graphical representation of an example virtual environment of an autonomous robot.

FIG. 3 illustrates an example virtual environment 300, which may be generated by EAOD engine 314. The virtual environment 300 indicates the current location of autonomous robot 302, and the estimated sizes, locations, and shapes of other objects detected in a corresponding real-world environment. For example, the virtual environment includes representations of a floor 304, a first wall 306, a second wall 308, a sofa 310, a person 312, and a recliner 314. The floor 304 and walls 306, 308 may be represented as planar structures in the virtual environment 300. The sofa 310, person 312, and recliner 314 are obstacles represented in the virtual environment 300 by bounding regions that approximate the respective sizes and shapes of the obstacles. In some implementations, the planning policies assigned to each obstacle define constraints for the robot's travel with respect to the obstacle in terms of distances from the outer perimeter of the obstacle's bounding region.

Referring again to FIG. 2, the system 200 can further include a semantic interpreter 218. The semantic interpreter 218 can be a software engine implemented on one or more computers of system 200. The semantic interpreter 218 is generally configured to recognize objects in the virtual environment and to determine semantic classes that correspond to the objects. For example, in FIG. 3, the semantic interpreter 218 has labeled objects 306-214 with descriptors that identify corresponding semantic classes for the objects 306-214. Object 312, for instance, has been identified as a person, while object 310 has been identified as a sofa.

The semantic interpreter 218 can classify objects in the robot's environment using any suitable techniques. In some implementations, the EAOD engine 214 processes images, LIDAR data, or other sensor data 212 to determine a set of features that characterize each object in the environment. The features can include physical characteristics such as dimensions of the object, colors of the object, and a shape or geometry of the object, and other characteristics such as a location of the object, a 3D model of the object, and a semantic relationship of the object to other objects or markers in the environment. The semantic interpreter 218 can receive the respective feature sets for the objects from the EAOD engine 214, and recognizes a semantic class for an object by comparing the feature set for the object to pre-defined signatures for different semantic classes of objects stored in the semantic library 220. In some implementations, the semantic interpreter 218 receives the object feature sets as part of virtual environment and object detection data 216. An object signature for a semantic class identifies a unique combination of features for objects belonging to the semantic class. The semantic interpreter 218 can compare the feature set for an object in the robot's environment to one or more signatures from the semantic library 220, and can select a semantic class for the object that has a closest-matching signature. In other implementations, the semantic interpreter 218 includes a deep neural network or other machine-learning model that processes sensor data 212 corresponding to an object and/or features for the object as inputs. The neural network or machine-learning model is trained to generate an output indicating a classification of the object into one of multiple semantic classes.

In some implementations, the semantic library 220 includes a database that maintains a hierarchy 222 of semantic classes. The semantic interpreter 218 can query the database to select an appropriate semantic class for an object in the robot's environment. In some implementations, the semantic interpreter 218 selects the most-specific class from the hierarchy 222 for which an object is determined to belong. For example, the semantic interpreter 218 may determine that a particular object in the robot's environment corresponds to a furniture class, and more specifically corresponds to a sofa sub-class within the furniture class in the hierarchy 222. The library 220 may further maintain a database of planning policies 224. All or some of the semantic classes (and sub-classes) represented in the hierarchy 222 may be linked to a corresponding planning policy in database 224. In some implementations, the database 224 may include increasingly specialized planning policies for classes represented further down the hierarchy 222. For example, the hierarchy 222 may include a branch of classes that progresses from a broad class "person," to a more specific class "non-ambulatory persons," to an even more specific class corresponding to a particular person, e.g., "person A." The planning policies database 224 may include different, increasingly specialized planning policies for each class or sub-class in this branch. A first planning policy for a "person" generally may define constraints that should apply to the robot's travel with respect to a person if additional information about the person is unknown. A second planning policy for a "non-ambulatory person" may define somewhat different constraints that are optimized for non-ambulatory people who are unable to walk unassisted. For example, the second planning policy for this sub-class may provide a larger buffer zone than would typically be afforded to the higher-level 'persons' class, so as to reduce the risk of collision with a wheelchair or other mobility aid for a non-ambulatory individual. A third planning policy may be specifically tailored to a particular person, "person A." The system 20 may learn the planning policy for a specific person (or any particular instance of another class of objects) based on prior experience interacting with and traveling with that person or object, or the planning policy may be based on parameters manually specified by the person via user input.

In some implementations, the semantic interpreter 218 selects a planning policy for an object in the robot's environment that corresponds to the object's most specifically determined semantic class. For example, if the semantic interpreter 218 identifies that a person is the environment is a specific individual for whom a personal planning policy has been designated, then that person's personal planning policy may be applied for the purposes of determining a path for the robot's travel. If a specialized planning policy is not available for the object's most-specific semantic class, then the semantic interpreter 218 may traverse the hierarchy 222 upward until a class is identified that has a corresponding planning policy. As such, the semantic interpreter 218 selects the most specialized planning policy available for an object.

Various factors may impact the semantic interpreter's ability to identify a lower-level semantic class for an object, including the quality and quantity of sensor data 212 available for the object. For instance, the robot may capture an image of a person from the front-side to obtain more distinguishing features that allow the semantic interpreter 218 to determine a lower-level sub-class for the person, or even to determine a specific identity of the person. However, if the robot's view of the person is obstructed or images cannot be obtained that depict as many distinguishing features, the semantic interpreter 218 may only be able to determine with sufficient confidence that the object corresponds to a higher-level "persons" semantic class such that a generalized planning policy is applied for the person.

Figure 4:
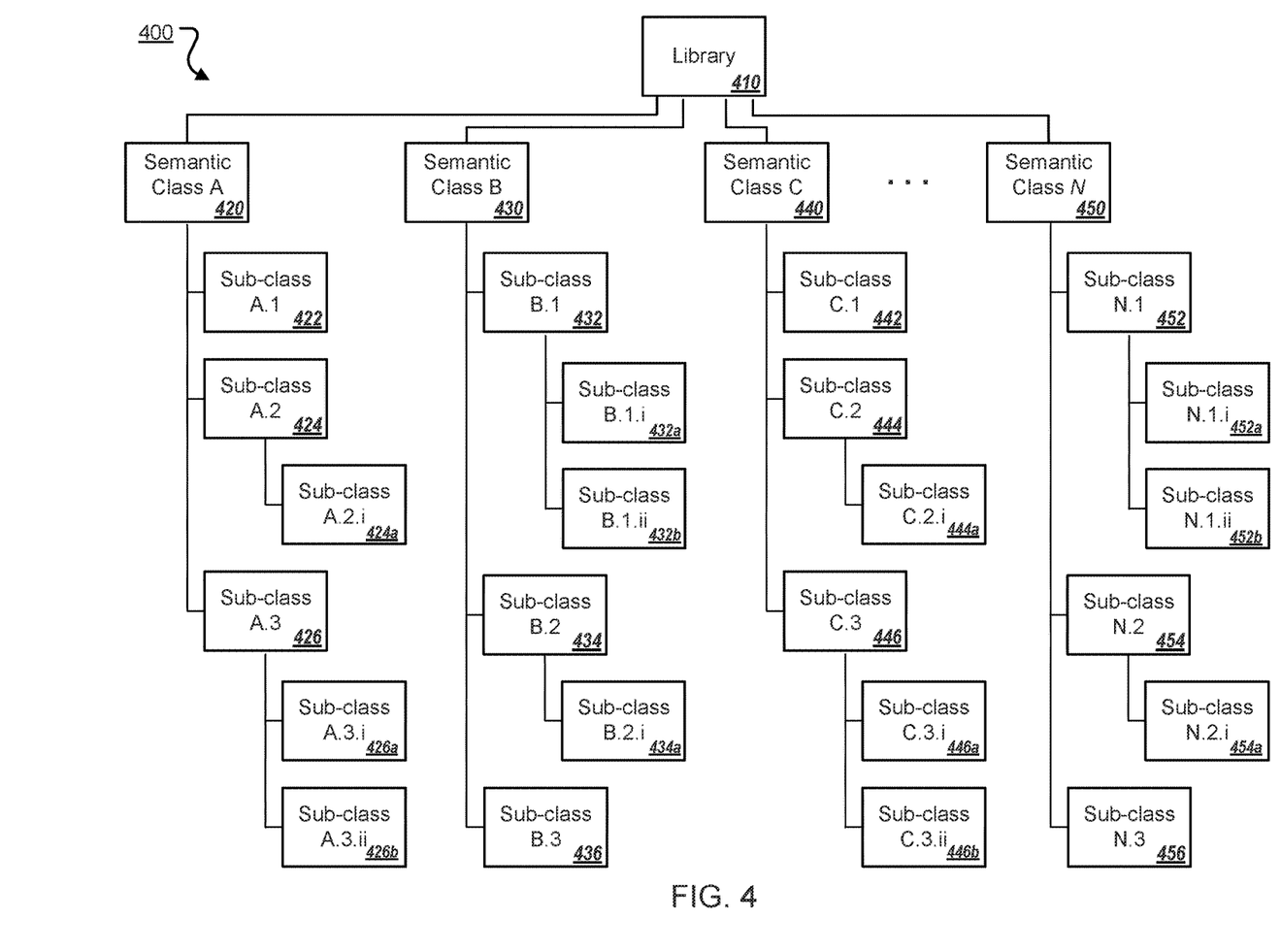
FIG. 4 depicts an example hierarchy of semantic classes from which a semantic interpreter can identify a corresponding semantic class for obstacles in a robot's environment.

For illustration, an example semantic class hierarchy 400 is depicted in FIG. 4. The hierarchy is stored in library 410, e.g., in a database implemented on one or more computers. The library 410 includes N first-level semantic classes, four of which are expressly shown in in FIG. 4 as Classes A (420), B (430), C (440), and N (450). Each of the first level classes may spawn any number of second-level classes, and each of these sub-classes may further spawn additional generations of sub-classes that relate to increasingly specific semantic features. For example, Semantic Class A (420) may relate to "household items," and its children classes A.1 (422), A.2 (424), and A.3 (426) may relate to different semantic categories of household items such as "laundry," "children's toys," and "furniture." The grandchildren classes in this branch may identify specific types of laundry, children's toys, and furniture, such as a "laundry basket," "blocks," "train set," "sofa," "desk," and "bed." The other branches based on classes B-N (430-450) may spawn similar hierarchical structures according to the types of objects encountered in their respective categories. In some implementations, each semantic class and sub-class represented in the hierarchy 400 is linked to a corresponding class signature that characterizes one or more features of objects in the class, and which the semantic interpreter 218 can use to identify an appropriate semantic class for an object in a robot's environment. Each class can also be linked to a planning policy, all or some of which may impose different constraints (e.g., cost functions) from each other.

The semantic interpreter 218 can, in some implementations, be configured to select a semantic class (and then a corresponding planning policy) that applies to a group of obstacles. For example, if a group of people are congregated in a section of a room or hallway, the semantic interpreter 218 may recognize a class representative of the group of people (e.g., from a bounding box that EAOD engine 214 applied around the group), such that the system 300 can select a planning policy that informs how the robot 202 is permitted to travel with respect to the group of people, rather than or in addition to constraints imposed by policies for individuals in the group. For example, the planning policy for the group indicate whether the robot can pass through the group, or a distance that the robot should stay away from the group.

Referring again to FIG. 2, the system 200 can also include a planning engine 234. The planning engine 234 includes a global planner 236 and a local planner 238. The global planner 236 is configured to plan a route for an autonomous robot to travel toward a specified goal location. The local planner 238 is configured to plan a path (also referred to as a trajectory) for the autonomous robot to follow along the planned route. The route for a robot is generally less specific than the path. For instance, while the route may indicate which rooms or regions of an environment the robot should travel through to reach the goal location, the path can indicate precise positions and movements for the robot to take to actually travel the route. The local planner 238, for example, may identify obstacles along the route and plan the robot's path so as to avoid the obstacles. Either planner 236, 238 may use data from one or more sources to generate a route or path. The global planner 236, for instance, may access maps database 228 to obtain mapping data 230 representing a map or layout of the robot's environment, as well as semantic data 232 that identifies semantic regions of the environment represented in the map and any constraints that bear on route planning. Based on a starting location, goal location, map, and any applicable semantic data 232, the global planner 236 can generates a route for the robot.

The route may be optimized, for example, to minimize the time or distance for the robot to reach the goal location.

The local planner 238 receives the planned route from global planner 236, along with semantically labeled environment data 226 and planning policy data 224, and generates a planned path from the current location of the robot 202 to a point along the route. The local planner 238 can constantly update the path as the robot travels, and so it may or may not generate a complete path that terminates at the goal location in a single pass. For example, in some implementations, the local planner 238 generates a path by determining a precise set of locations in the environment for the robot 202 to travel and corresponding times for the robot 202 to advance to those locations. For instance, the planner 238 may determine a set of 20 locations that the robot 202 should travel to along a path at 200 millisecond intervals.

The semantically labeled environment data 226 identifies the locations of objects in the robot's environment and the corresponding semantic classes that the semantic interpreter 218 has identified for the objects. The local planner 238 uses this data to access planning policies 224 corresponding to the semantic classes of the objects, and generates an output representing a planned path for the robot 202. The local planner 238 can also use mapping data 230 and semantic data 232 to plan the path, e.g. to identify walls, ceilings, and structural characteristics of the environment. In some implementations, the local planner 238 generates the route by optimizing a path cost function so as to minimize the cost of the robot traveling with respect to other objects in the environment. The path cost function may be derived from individual cost functions defined by the planning policies 224 for obstacles in the robot's environment. In some implementations, the local planner 238 applies different cost functions to objects from different semantic classes, and/or between instances of objects within the same semantic class.

The planning engine 234 provides trajectory data 240 to a controller 242 of the robot 202. The trajectory data 240 represents the planned path or trajectory for the robot 202. For instance, the trajectory data 240 can include a vector of coordinates representing a series of locations along the path that the robot should advance to at discrete times. The controller 242 is operable to generate control signals 244 to one or more mechanical actuators in the robot 202, thereby causing the robot 202 to move along the planned path. In some implementations, even before the robot 202 has traveled along the entire length of a planned path (e.g., corresponding to a segment of the route), the system 200 may re-analyze the environment and update the planned path on a frequent basis to ensure the robot continues to travel on an optimized trajectory even as conditions in the environment may change over time during the course of the robot's travel.

In some implementations, the local planner 238 can select a planning policy for an obstacle based not just on the semantic class of that obstacle, but also of one or more other obstacles in the environment (e.g., obstacles within a threshold distance of the first obstacle). For example, a particular semantic class may have multiple planning policies associated with it. The system may select an appropriate one of the planning policies based on whether other obstacles within the same or similar semantic classes are located in the robot's environment, e.g., within a threshold distance of the first obstacle.

Figure 5:
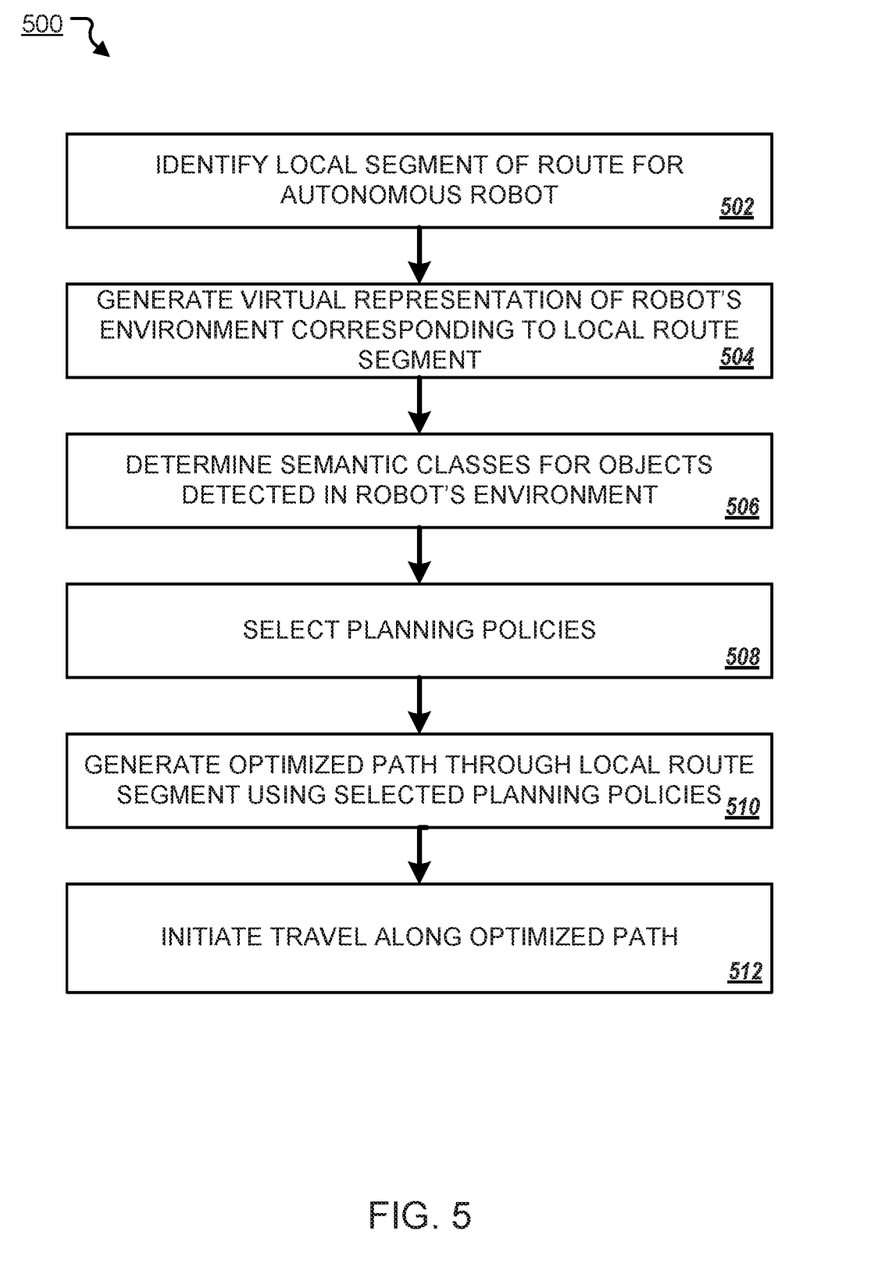
FIG. 5 is a flowchart of an example process for determining a travel path for an autonomous robot using semantic information about objects in the robot's environment.

FIG. 5 is a flowchart of an example process 500 for determining a travel path for an autonomous robot using semantic information about objects in the robot's environment. The process can be performed by a system of one or more computers, e.g., system 200 (FIG. 2). In some implementations, the process 500 is performed entirely by systems on the robot itself. In other implementations, the robot may communicate with remote computers to perform certain aspects of the process 500 of generating a travel path.

At stage 502, the system identifies a local segment of a route for the autonomous robot. A global planner may have generated a route to navigate the robot in an environment from a starting location to a goal location. A local segment of the route refers to a portion of the route for which the system can plan a travel path. For example, the local segment may contain a portion of the overall route corresponding to a region of the environment that the robot has analyzed, or is capable of analyzing, from its current location, e.g., a region of the environment that is currently within view and within a sensing range of the robot's sensor subsystems.

At stage 504, the system generates a virtual representation of the region of the environment that contains the local segment of the route. The virtual representation can be generated by an environmental analyzer and obstacle detection engine, e.g., EAOD engine 214. The virtual representation can identify obstacles and other objects in the robot's environment and their locations in the environment. In some implementations, the EAOD engine determines bounding regions for the object that indicate the physical size and approximated shape of the object. The EAOD engine may also determine feature sets for the detected objects by analyzing images, LIDAR data, and/or other sensor data captured by the robot.

At stage 506, the system determines semantic classes for the objects represented in the virtual environment. In some implementations, the semantic class is determined by a semantic interpreter, e.g., semantic interpreter 218. The semantic interpreter can analyze a feature set for an object, or process image and/or LIDAR data focused on the object, to determine a semantic class to which the object belongs. In some implementations, the semantic interpreter selects a most specific semantic class for the object from a hierarchy of semantic classes.

At stage 508, the system selects planning policies to attach to the obstacles and, if applicable, other objects in the robot's environment. The planning policies can define constraints with respect to the robot's travel relative to obstacles in the environment. In some implementations, a planning engine, including a local planner, selects a planning policy for an object from a library of policies that is assigned to the semantic class of the object. In this way, different semantic policies, and hence different travel constraints, may be imposed on the robot for different classes of objects. As such, the robot may comply with unique safety and social considerations for various classes of objects during its travel.

At stage 510, the planning engine determines a path for the robot using the selected planning policies. The path identifies where the robot should travel over an upcoming period of time, and the robot may continue to follow the path until it is either completed or a new, updated path is generated. The planning engine can determine a trajectory cost function that is based on the individual cost functions defined by the respective planning policies of all or a subset of obstacles represented in the virtual environment. The planning engine can then generate a path for the robot that optimizes the trajectory cost function, e.g., by minimizing a total cost of the robot traveling the path with respect to each of the obstacles. The trajectory cost function, for example, may impose higher costs on paths that violate constraints of any of the obstacles in the environment (e.g., by encroaching on the obstacles' buffer zones or intersecting the obstacles), and may impose lower costs on paths that better comply with the travel constraints.

Once the planning engine has generated a planned path for the robot, data representative of the path is provided to a controller on the robot. The controller generates control signals to actuate mechanical components of the robot, thereby causing the robot to initiate travel along the planned path (stage 512).

Figure 6:
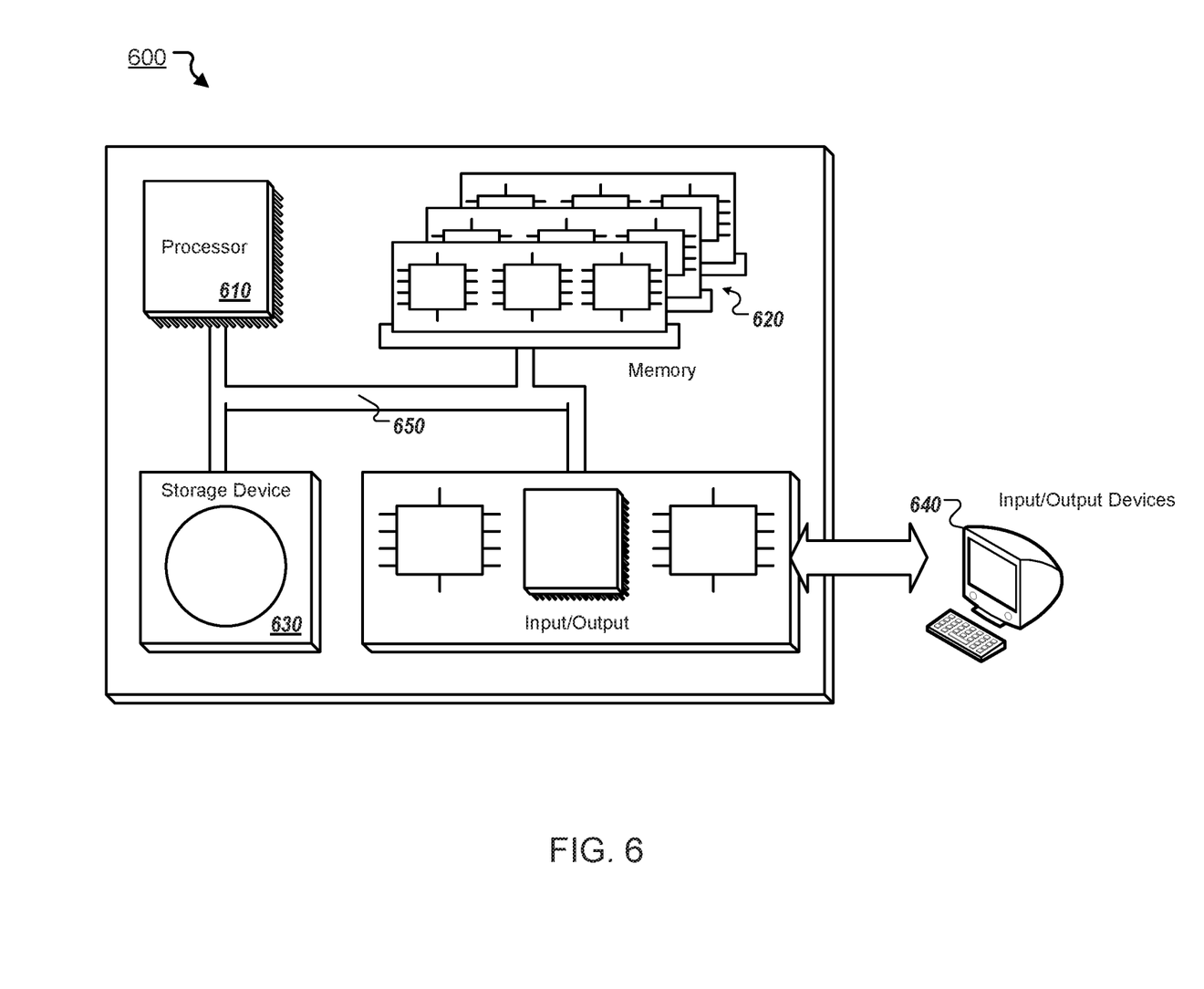
FIG. 6 is a schematic diagram of a computing device that can be used to carry out the operations described in association with the computer-implemented methods and other techniques described in this specification.

FIG. 6 is a schematic diagram of a computing device 600. The device 600 can be used to carry out the operations described in association with any of the computer-implemented methods and other techniques described previously, according to an example implementation. The device 600 is intended to include various forms of digital computers, such as laptops, desktops, workstations, personal digital assistants, servers, blade servers, mainframes, and other appropriate computers. The device 600 can also include mobile devices, such as personal digital assistants, cellular telephones, smartphones, and other similar computing devices. Additionally the system can include portable storage media, such as, Universal Serial Bus (USB) flash drives. For example, the USB flash drives can store operating systems and other applications. The USB flash drives can include input/output components, such as a wireless transmitter or USB connector that can be inserted into a USB port of another computing device.

The device 600 includes a processor 610, a memory 620, a storage device 630, and an input/output device 640. Each of the components 610, 620, 630, and 640 are interconnected using a system bus 650. The processor 610 is capable of processing instructions for execution within the device 600. The processor can be designed using any of a number of architectures. For example, the processor 610 can be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the device 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can be a floppy disk device, a hard disk device, an optical disk device, or a tape device.

The input/output device 640 provides input/output operations for the system 400. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method, comprising:
   identifying, by a computing system, one or more obstacles that are located in proximity of at least a portion of a planned route for an autonomous robot;
   for each obstacle:
   (i) determining a semantic class of the obstacle, including selecting the semantic class from a library that defines a plurality of possible semantic classes for obstacles, wherein the library comprises a hierarchical representation of the plurality of possible semantic classes and wherein the library includes a database that includes increasingly specialized planning policies for classes represented further down the hierarchy, each planning policy describing at least one constraint with respect to travel of the autonomous robot relative to the obstacle, wherein selecting the semantic class of the obstacle comprises traversing the hierarchical representation of the plurality of possible semantic classes to locate a most-specific semantic class for the obstacle, and
   (ii) selecting a planning policy for the obstacle that corresponds to the semantic class of the obstacle;
   generating, by the computing system, a trajectory along the at least the portion of the planned route for the autonomous robot, the trajectory being based on the constraints described by the planning policies for the one or more obstacles located in proximity of the at least the portion of the planned route; and
   initiating travel of the autonomous robot according to the trajectory.

2. The computer-implemented method of claim 1, wherein the most-specific semantic class for the obstacle identifies the obstacle as a particular instance of an object within a higher-level semantic class for the obstacle.

3. The computer-implemented method of claim 1, wherein each semantic class in the hierarchical representation is linked to a corresponding class signature that characterizes one or more features of objects in the semantic class.

4. The computer-implemented method of claim 1, wherein the library identifies a respective planning policy for each semantic class of the plurality of possible semantic classes, and the respective planning policies for at least a subset of the plurality of possible semantic classes describe different constraints from each other.

5. The computer-implemented method of claim 1, wherein generating the trajectory along the at least the portion of the planned route for the autonomous robot comprises determining a trajectory that optimizes a trajectory cost function, the trajectory cost function being based on the respective cost functions for the one or more obstacles located in proximity of the at least the portion of the planned route.

6. The computer-implemented method of claim 1, wherein the semantic class of a first obstacle of the one or more obstacles that are located in proximity of the at least the portion of the planned route for the autonomous robot identifies the first obstacle as a person.

7. The computer-implemented method of claim 6, wherein the semantic class of a second obstacle of the one or more obstacles that are located in proximity of the at least the portion of the planned route for the autonomous robot identifies the second obstacle as an inanimate object.

8. The computer-implemented method of claim 1, further comprising:
   after initiating travel of the autonomous robot according to the trajectory, but before completing the travel, generating an updated trajectory; and
   initiating travel of the autonomous robot according to the updated trajectory before completing the travel of the autonomous robot according to the trajectory.

9. The computer-implemented method of claim 1, wherein identifying the one or more obstacles that are located in proximity of the at least the portion of the planned route for the autonomous robot comprises detecting the one or more obstacles in a representation of an environment of the autonomous robot, the representation of the environment generated using sensor data from one or more sensors of the autonomous robot, the one or more sensors including at least one of a camera system or a light detection and ranging (LIDAR) system.

10. The computer-implemented method of claim 1, wherein the at least one constraint comprises a cost function that defines a cost of travel of the autonomous robot as a function of a distance between the autonomous robot and the obstacle.

11. The computer-implemented method of claim 1, wherein the at least one constraint comprises a cost function that defines a cost of travel of the autonomous robot as a function of a speed of the autonomous robot at various distances from the obstacle during the travel of the autonomous robot.

12. The computer-implemented method of claim 1, further comprising selecting a semantic class and a corresponding planning policy that applies to a group of obstacles.

13. A computing system, comprising:
one or more processors; and
one or more computer-readable media having instructions stored thereon that, when executed by the one or more processors, cause the one or more processors to perform operations comprising:
identifying one or more obstacles that are located in proximity of at least a portion of a planned route for an autonomous robot;
for each obstacle:
  (i) determining a semantic class of the obstacle, including selecting the semantic class from a library that defines a plurality of possible semantic classes for obstacles, wherein the library comprises a hierarchical representation of the plurality of possible semantic classes and wherein the library includes a database that includes increasingly specialized planning policies for classes represented further down the hierarchy, each planning policy describing at least one constraint with respect to travel of the autonomous robot relative to the obstacle, wherein selecting the semantic class of the obstacle comprises traversing the hierarchical representation of the plurality of possible semantic classes to locate a most-specific semantic class for the obstacle, and
  (ii) selecting a planning policy for the obstacle that corresponds to the semantic class of the obstacle;
generating a trajectory along the at least the portion of the planned route for the autonomous robot, the trajectory being based on the constraints described by the planning policies for the one or more obstacles located in proximity of the at least the portion of the planned route; and
initiating travel of the autonomous robot according to the trajectory.

14. The computing system of claim 13, wherein the most-specific semantic class for the obstacle identifies the obstacle as a particular instance of an object within a higher-level semantic class for the obstacle.

15. The computing system of claim 13, wherein each semantic class in the hierarchical representation is linked to a corresponding class signature that characterizes one or more features of objects in the semantic class.

16. The computing system of claim 13, wherein the library identifies a respective planning policy for each semantic class of the plurality of possible semantic classes, and the respective planning policies for at least a subset of the plurality of possible semantic classes describe different constraints from each other.

17. The computing system of claim 13, wherein generating the trajectory along the at least the portion of the planned route for the autonomous robot comprises determining a trajectory that optimizes a trajectory cost function, the trajectory cost function being based on the respective cost functions for the one or more obstacles located in proximity of the at least the portion of the planned route.

18. One or more non-transitory computer-readable media having instructions stored thereon that, when executed by one or more processors, cause the one or more processors to perform operations comprising:
identifying one or more obstacles that are located in proximity of at least a portion of a planned route for an autonomous robot;
for each obstacle:
  (i) determining a semantic class of the obstacle, including selecting the semantic class from a library that defines a plurality of possible semantic classes for obstacles, wherein the library comprises a hierarchical representation of the plurality of possible semantic classes and wherein the library includes a database that includes increasingly specialized planning policies for classes represented further down the hierarchy, each planning policy describing at least one constraint with respect to travel of the autonomous robot relative to the obstacle, wherein selecting the semantic class of the obstacle comprises traversing the hierarchical representation of the plurality of possible semantic classes to locate a most-specific semantic class for the obstacle, and
  (ii) selecting a planning policy for the obstacle that corresponds to the semantic class of the obstacle;
generating a trajectory along the at least the portion of the planned route for the autonomous robot, the trajectory being based on the constraints described by the planning policies for the one or more obstacles located in proximity of the at least the portion of the planned route; and
initiating travel of the autonomous robot according to the trajectory.

* * * * *